United States Patent [19]

Demeri

[11] Patent Number: 4,664,420
[45] Date of Patent: May 12, 1987

[54] PNEUMATIC SELF-SEALING FEMALE COUPLING INCORPORATING COMBINATION LOCKING TUMBLERS

[75] Inventor: Robert Demeri, Wantaugh, N.Y.

[73] Assignee: Island Rubber & Equipment Co., Inc., Freeport, N.Y.

[21] Appl. No.: 902,775

[22] Filed: Sep. 2, 1986

[51] Int. Cl.⁴ ............................................. F16L 37/22
[52] U.S. Cl. ...................................... 285/86; 285/93; 285/316; 137/552.5; 251/149.6
[58] Field of Search ................. 285/316, 277, 914, 86, 285/93; 251/149.6; 137/552.5

[56] References Cited

U.S. PATENT DOCUMENTS

| | | | |
|---|---|---|---|
| 2,797,110 | 6/1957 | Covington | 285/277 X |
| 3,097,867 | 7/1963 | Saloum | 285/86 |
| 3,170,667 | 2/1965 | Szohatzky | 285/914 X |
| 3,359,015 | 12/1967 | Zahuranec | 285/316 X |
| 4,060,219 | 11/1977 | Crawford | 285/316 X |
| 4,498,658 | 2/1985 | Mikiya | 285/316 X |

FOREIGN PATENT DOCUMENTS

| | | | |
|---|---|---|---|
| 1178311 | 9/1964 | Fed. Rep. of Germany | 137/552.5 |
| 768286 | 5/1934 | France | 137/552.5 |
| 967497 | 8/1964 | United Kingdom | 137/552.5 |

Primary Examiner—Thomas F. Callaghan
Attorney, Agent, or Firm—David M. Rosenblum

[57] ABSTRACT

The present invention provides an improved, self sealing, female pneumatic coupling of the type that releasably engages a grooved nipple attached to a pneumatic tool or fixture. The conventional elements of the female coupling include a ball bearing latch that prevents removal of the grooved nipple when activated and a locking sleeve to activate the ball bearing latch. The improvement of the present invention, in a preferred embodiment, includes locking sleeve having separable segments to form a set of first, second and third combination locking tumblers each of annular configuration. A set of numbers is provided on the outer periphery of each of the tumblers. Each of the tumblers must be rotated so that a selected number thereof is opposite to an index before the locking sleeve can be moved to deactivate the ball bearing latch. As a result, removal of the tool or fixture attached to the grooved nipple is prevented by unauthorized persons not knowing the combination of the selected numbers of the locking tumblers.

6 Claims, 9 Drawing Figures

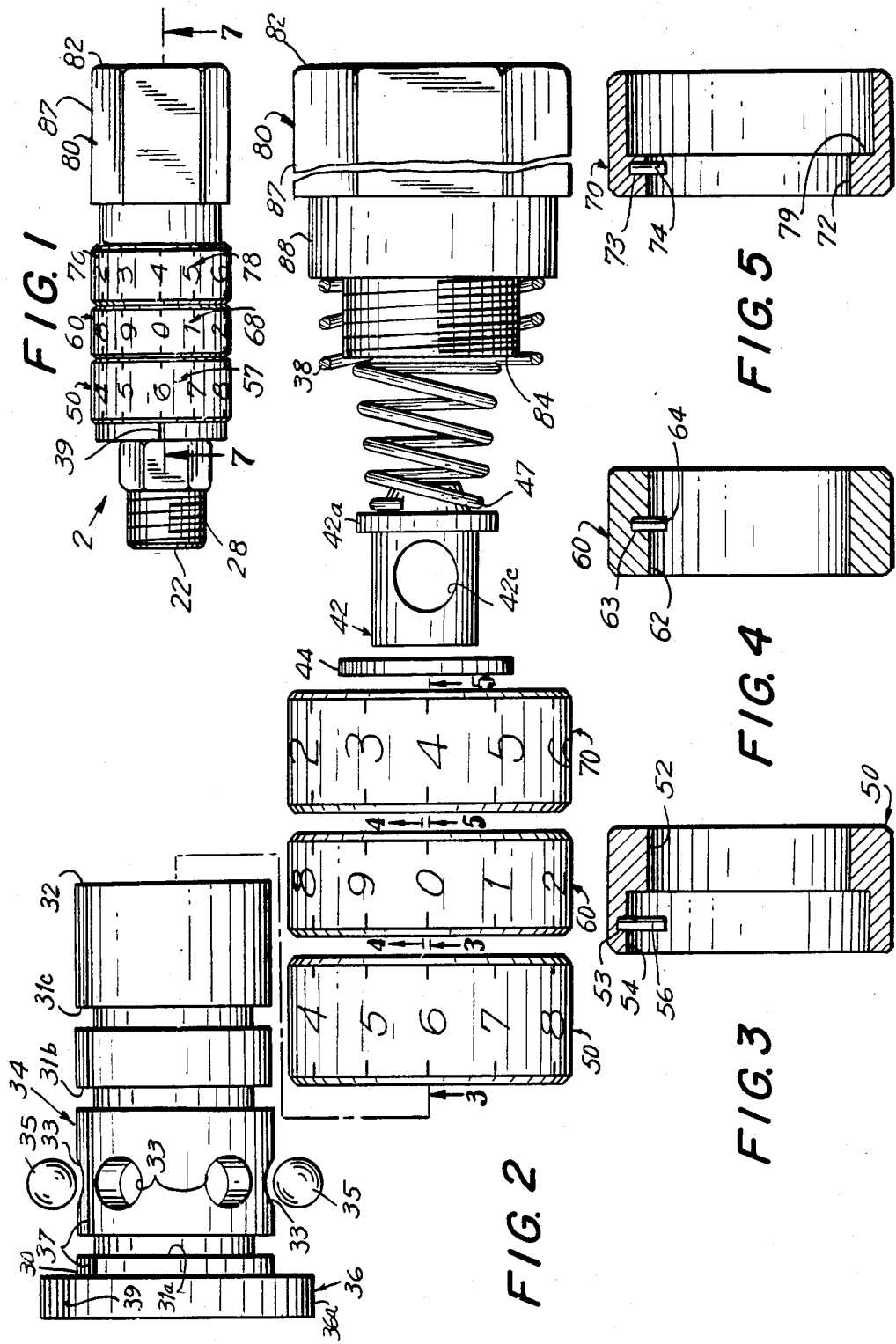

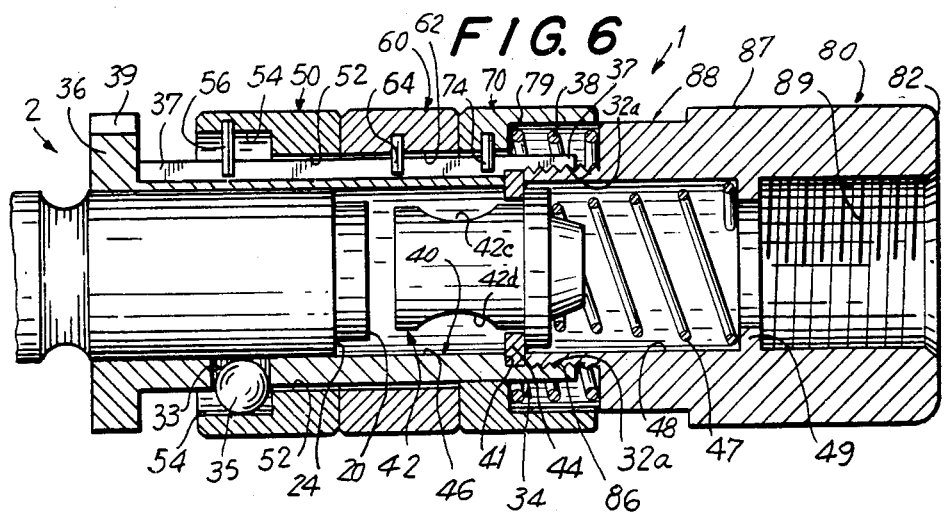
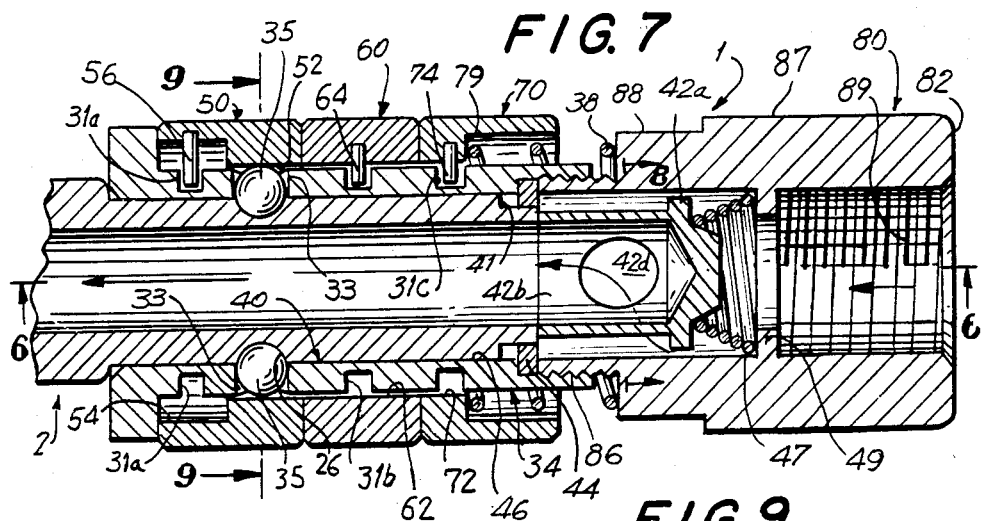
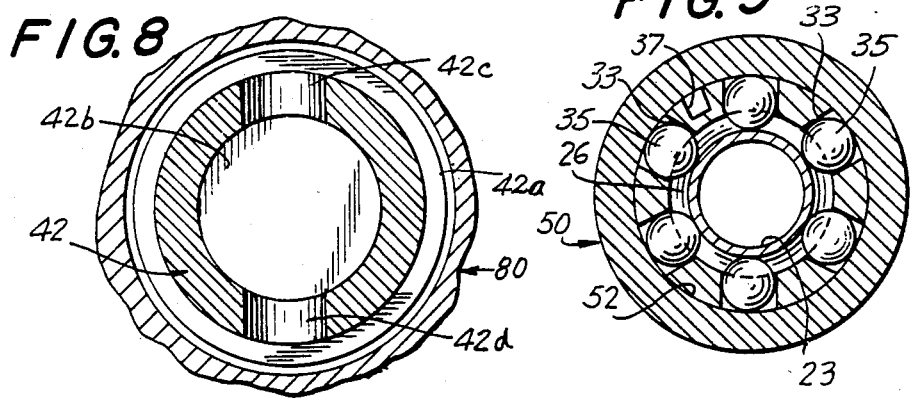

PNEUMATIC SELF-SEALING FEMALE COUPLING INCORPORATING COMBINATION LOCKING TUMBLERS

FIELD OF THE INVENTION

This invention relates to pneumatic couplings and more particularly to an improved pneumatic, self-sealing female coupling that incorporates combination locking tumblers to prevent the unauthorized separation of the female coupling from a grooved nipple that is operable to be connected to a pneumatic tool or fixture.

BACKGROUND OF THE INVENTION

There exist specialized pneumatic couplings that are commonly used in automotive repair shops to connect pneumatic tools and fixtures such as air driven impact drivers, air chucks and the like to an air line. In such couplings a male portion of the coupling, which commonly consists of a grooved nipple attached to a tool, is releasably connected to a self-sealing female coupling attached to an air line. Tools and fixtures, which are expensive, are commonly stolen by simply disconnecting the coupling. Although it is possible to accomplish such thefts by cutting the air line, this is not done because of the noise resulting from high pressure air escaping from a cut air line. Since the mechanics who work in such shops very often supply their own tools, such thefts result in expensive personal, monetary losses. The present invention therefore, seeks to prevent the theft of a tool or fixture attached to an air line by a coupling by providing a combination lock to a pneumatic, self-sealing female coupling.

SUMMARY OF THE PRESENT INVENTION

The present invention provides an improved pneumatic, self sealing female coupling of the type that has a cylindrical portion having a pair of opposed ends, a forward abutment connected to one of the ends, a rearward abutment connected to the other of the ends and an air passage communicating between the forward and the rearward abutments. A ball bearing latch, associated with the air passage and the cylindrical portion releasably attaches, at the forward abutment and within the air passage, a grooved nipple that is operable to be connected to a pneumatic tool or fixture. A locking sleeve of annular configuration is provided. The locking sleeve is telescoped in the cylindrical portion and is adapted for a reciprocating movement of the cylindrical portion between a locked position against the forward abutment, to activate the ball bearing latch, and an unlocked position against the rearward abutment, to deactivate the ball bearing latch. Means are provided for biasing the locking sleeve in its locked position. Means, associated with the air passage are provided for sealing the air passage when the grooved nipple is not located therein and for providing a seal when the grooved nipple is located therein. Lastly, means are provided for attaching an air line to the rearward abutment and in communication with the air passage.

The improvement comprises a locking sleeve including a plurality of independent sections, each of which forms a combination locking tumbler. Each locking tumbler includes an outer periphery having an array of numbers radially arranged thereabout. The numbers are equally spaced from one another. The inner periphery of each locking tumbler has a locking pin connected thereto in an inwardly directed, radial orientation. In the improvement the cylindrical portion has a plurality of circumferential grooves spaced apart from one another with each of the grooves being located in the same plane of a locking pin as viewed when the locking sleeve is in its locked position. Each of the grooves is sized for a close fitting sliding engagement with a locking pin. A longitudinally extending groove is also provided. The longitudinally extending groove at least intersects the circumferential grooves at right angles and extends to the other end of the cylindrical portion. The longitudinal groove is sized for a close fitting sliding engagement with the locking pins. Lastly, an index is located on the forward abutment.

As a result of the foregoing structure of the improvement, when the locking sleeve is in its locked position, the locking pins are in registry with the circumferential grooves and the combination locking tumblers thereof are operable for a random rotation about the cylindrical portion so that the locking sleeve is not operable for reciprocating movement into its unlocked position. Thus, the grooved nipple and the pneumatic tool or fixture connected thereto is also not operable for separation from the female coupling. When the combination locking tumblers are rotated about the cylindrical portion such that a selected number of each, known only to a user of the female coupling, is opposite to the index, the locking pins are operable for entry into the longitudinal groove to thereby permit the locking sleeve to be reciprocated into its unlocked position to thereby permit the grooved nipple and the pneumatic tool or fixture connected thereto to be separated from the female coupling.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings in which:

FIG. 1 is a side view of the pneumatic coupling of the present invention.

FIG. 2 is an enlarged, partial exploded side view of the present invention showing the cylindrical portion, the combination locking tumblers, the ball bearing latch, the locking spring and the sealing means.

FIG. 3 is a side crossectional view of the first combination locking sleeve of the present invention as viewed along line 3—3 of FIG. 2.

FIG. 4 is a side crossectional view of the second combination locking sleeve of the present invention as viewed along line 4—4 of FIG. 2.

FIG. 5 is a side crossectional view of the third combination locking sleeve of the present invention as viewed along line 5—5 of FIG. 2.

FIG. 6 is a side, partial crossectional view of the pneumatic coupling of the present invention as viewed along line 6—6 of FIG. 7 with the locking sleeve in its unlocked position and with the grooved nipple 2 partially unconnected from the female coupling 1.

FIG 7 is a side, partial crossectional view of the pneumatic coupling of the present invention taken along line 7—7 of FIG. 1, with the sleeve in its locked position.

FIG. 8 is a crossectional view of the pneumatic coupling of the present invention as viewed along line 8—8 of FIG. 7.

FIG. 9 is a crossectional view of the pneumatic coupling of the present invention as viewed along line 9—9 of FIG. 7.

DETAILED DESCRIPTION OF THE INVENTION

Referring now to FIG. 1, the present invention provides an improved pneumatic, self-sealing female coupling 1. The female coupling 1 is operable for a releasable engagement with a grooved nipple 2. Grooved nipple 2 is operable to be attached to a pneumatic tool or fixture in a manner well known in the art by the use of threads 28 thereof. The female coupling utilized in the present invention is that type that is provided with a ball bearing latch and locking sleeve arrangement. Referring to FIGS. 6 and 7, the ball bearing latch includes a plurality of holes 33 in a cylindrical portion 34 and ball bearings 35. The bearings 35 are operable for engagement with a locking groove 26 of grooved nipple 2. As illustrated by FIGS. 7 and 9, when ball bearings 35 are seated in locking locking groove 26, the ball bearings 35 prevent removal of grooved nipple 2 and thus the pneumatic tool or fixture. As illustrated by FIG. 6, when the ball bearings 35 are permitted to unseat from locking locking groove 26, the grooved nipple 2 can be removed and hence the pneumatic tool or fixture.

As is well known in the art, the activation and deactivation of the ball bearing latch is controlled by a locking sleeve. The locking sleeve is adapted for reciprocating movement between a locked position, against a forward abutment, and an unlocked position, against a rearward abutment. A conventional locking sleeve used with the pneumatic female coupling that was incorporated into the present invention has a central bore and enlarged bores at either end; one adjacent to a forward abutment and the other adjacent to a rearward abutment. With reference to FIG. 1, in the coupling utilized, the forward abutment is a radially extending flange portion 36 connected to end 30 and the rearward abutment is a hexagonal flange portion 80 connected to end 32. In the locking sleeve, the bore adjacent to the rearward abutment is enlarged to permit the a locking spring 38 to extend therein. Locking spring 38 biases the locking sleeve in its locked position. The central bore surrounds the ball bearings, such as 35, when the locking sleeve is in its locked position. It is sized to urge the ball bearings 35 into their seated position. When the locking sleeve is in its unlocked position, the bore adjacent to the forward abutment surround the ball bearings and is enlarged to permit the ball bearings to unseat from holes 33 and locking groove 26.

In the improvement of the present invention, in a preferred embodiment thereof, the locking sleeve includes a plurality of independent sections, each of which forms a combination locking tumbler illustrated by reference numerals 50, 60, and 70. Now, with reference to FIG. 7. the ball bearings 35 are urged in their seated position within locking groove 26 by a bore 52 of first combination locking tumbler 50. Bore 52 has the same function as the central bore in a conventional locking sleeve. This illustrated position of the combination locking tumblers, 50, 60 and 70 (Against flange 36) correspond with the locked position of a known locking sleeve. With reference now to FIG. 6, when the combination locking tumblers are reciprocated into the illustrated position thereof a bore 54 of first combination locking tumbler surrounds bearings 35, the bearings 35 are then free to unseat from locking groove 26 and the grooved nipple 2 is thus free to be separated from female coupling 1. The bore 54 has the same function as the enlarged bore in a conventional locking sleeve that is located adjacent to the forward abutment. This illustrated position of the locking tumblers 50, 60 and 70, (Against flange 80) corresponds to the unlocked position of a known locking sleeve.

In the improvement of the present invention, in a preferred embodiment thereof, the three combination locking tumblers 50, 60 and 70 have respectively, first, second and third arrays of numbers 57, 68 and 78. The first, second and third combination locking tumblers must be rotated so that a selected number of each array thereof is opposite to an index 39, which is preferably located on outer periphery 36a of radially extending flange portion 36, before movement of any of the tumblers 50, 60 and 70. Thus, unless all tumblers 50, 60 and 70 can be moved, the locking sleeve formed thereby cannot be reciprocated into its unlocked position to deactivate the ball bearing latch and to thereby allow uncoupling of the grooved nipple 2 from female coupling 1. For that matter the formed locking sleeve of the present invention must be reciprocated into its unlocked position to permit the coupling of grooved nipple 2 and the pneumatic tool or fixture attached thereto with the female coupling 2. Since the preset selective combination of numbers is only known to the user of the female coupling 2, an unauthorized person such as a thief cannot easily appropriate the pneumatic tool or fixture.

Having thus generally described the operation of the preferred embodiment, a more detailed description follows with a description of the pneumatic coupling utilized in the preferred embodiment of the subject invention. With reference to FIGS. 1 and 7, this coupling includes a female self-sealing, pneumatic coupling 1 and a grooved nipple 2 many components of which can be obtained from REMACO of 200 Paris Avenue, Northside, New Jersey. The grooved nipple 2, which constitutes the male portion of the coupling, has a pair of opposed ends 20 and 22, an end sealing groove 24 at end 20, a circumferential locking groove 26 spaced from sealing end groove 24 and a plurality of threads 28 at end 22. With reference to FIG. 9, a bore 23 is provided therein to allow air to flow to the pneumatic tool or fixture. With reference to FIG. 1, in automotive repair shops a mechanic often provides his or her own tools preconnected to such standard grooved nipples as illustrated by reference number 2 by the threads 28 thereof. When the mechanic needs another tool, he or she simply disconnects the tool attached to the female coupling 1 and replaces it with another tool also preattached to another grooved nipple 2.

Female coupling 1 includes a cylindrical portion 34 having opposed ends 30 and 32 thereof. As can best be seen in FIG. 2, a forward abutment is connected to one end 30 and in the preferred embodiment this forward abutment comprises a radially extending flange portion 36 having outer periphery 36a. A purpose of the flange portion 36 and the forward abutment provided thereby is to limit the forward travel of the locking sleeve when in its locked position. A rearward abutment is connected to the other end 32 and in the preferred embodiment this rearward abutment comprises an enlarged hexagonal flange portion 80 having a pair of opposed ends 82 and 84 and a pair of adjacent segments 87 and 88. Segment 87 has a greater diameter than segment 88. Segment 88 functions as a bearing surface for the locking spring 38 to compress and bias the locking sleeve in its locked postion. The purpose of segment 87 is to limit the degree of travel of the locking sleeve so that the ball bearings 35 remain surrounded by bore 54 when the locking sleeve is in its unlocked position to prevent loss of the bearings. A plurality of external threads 86 are located at end 84 to engage internal threads 32a within end 32 of the cylindrical portion 34 for connection purposes thereof. Internal threads 89 are provided for at end 82 of flange 80 as means for attachment of an air line thereto in a manner well known in the art.

Air passage 40 communicates between the radially extending flange 36 and hexagonal flange 80 and thus also extends through cylindrical portion 34. Air passage 40 is configured to slidably receive the grooved nipple 2, locking groove 26 first, at radially extending flange portion 36. As can best be seen in FIGS. 6, 7 and 8 means, located within the air passage 40 are provided for preventing air from escaping from air passage 40, when the grooved nipple 2 is not received therein; and for providing a seal between grooved nipple 2 and air passage 40 when grooved nipple 2 is received therein. Such means constitute the self-sealing feature of such female couplings of concern here. These means are a poppet valve 42 and sealing ring 44 arrangement located in air passage 40. Air passage 40 comprises bores 46 and 48 provided in respective portions 34, 36 and portion 80. Bore 48 has a greater diameter than bore 46 to provide a primary shoulder 41. Sealing ring 44 is placed in bore 48 in an abutting relationship with primary shoulder 41 to provide a valve seat thereby for poppet valve 42 and a seal for grooved nipple 2. Poppet valve 42 has a valve head 42a to seal against sealing ring 44 and a hollow valve stem 42b with opposed exhaust ports 42c and 42d. The poppet valve 42 is biased in a closed and sealed position by valve spring 47 which bears against valve head 42a and against a secondary shoulder 49 in flange portion 80. When grooved nipple 2 is not received within air passage 40, the poppet valve is thus in its sealed and closed position as illustrated by FIG. 6 to prevent the escape of air through female coupling 1. As illustrated in FIG. 7 when grooved nipple 2 is inserted in air passage 40, end 20 first, end 20 forces poppet valve 42 into its open position and air can flow (in the direction indicated by the arrows) through intake ports 42c and 42d and through grooved nipple 2 to the pneumatic tool or fixture. A seal in provided between sealing ring 44 and sealing end groove 24.

Referring again to FIGS. 6 and 7 female coupling 1 is provided with a ball bearing latch. The well known ball bearing latch includes a set ball bearings 35 sized to seat in holes 33. Referring now also to FIGS. 2 and 9 the holes 33 communicate between air passage 40 and the outer surface of cylindrical portion 34. The holes 33 are in a radial arrangement and are equally spaced from end 30 and from one another. As can best be seen in FIG. 9 the pneumatic female coupling 2 utilized in the present invention has six holes 33 and six ball bearings 35. The ball bearings 35 are sized such that when seated in the holes 33 they protrude into air passage 40 and seat in locking groove 26 of the grooved nipple 2. When the ball bearings 35 are seated within the locking groove 26 of the grooved nipple 2 removal thereof is prevented. This seated position of the ball bearings illustrated in FIGS. 7 and 9 constitute the activated position of the ball bearing latch as described above. When the ball bearings 35 are permitted to unseat from locking groove 26, removal of the grooved nipple 2 and the pneumatic tool or fixture connected thereto is thereby permitted. This unseated position of the bearings 35, or the deactivated position of the ball bearing latch is illustrated in FIG. 6.

Turning now to the improvement of the present invention, the activation and deactivation of the ball bearing latch is conventionally accomplished by a locking sleeve which as described above, in a preferred embodiment of the present invention, includes a set of separable sections to form three combination locking tumblers 50, 60 and 70, which are referred to herein as respectively the first, second and third combination locking tumblers. As can best be seen in FIG. 1, first combination locking tumbler is adjacent to radially extending flange portion 36, third combination locking tumbler 70 is adjacent to hexagonal flange portion 80 and second combination locking tumbler 60 is located between the first and second combination locking tumblers 50 and 70.

The actual activation and deactivation of the ball bearing latch is accomplished by first combination locking tumbler 50. First combination locking tumbler 50 has an inner periphery that has a first pair of contiguous adjacent bores 52 and 54. Referring now to FIGS. 3, 7 and 9 one of the bores 52 has a diameter sized to produce a close fitting sliding engagement with ball bearings 35 when seated. Thus when bore 52 surrounds bearings 35, the bearings 35 are urged in their seated position within holes 33, protruding into the air passage and seated in locking groove 26 of grooved nipple 2 to prevent the removal thereof. Referring now to FIGS. 3 and 6, the other of the bores 54 has a diameter greater than that of the one bore 52 and is sized to permit the ball bearings 35 to unseat from holes 33 and locking groove 26 of the grooved nipple 2 when surrounded therewith to thereby permit the removal of the grooved nipple 2. The bores 52 and 54 are arranged such that the other bore 54 is adjacent to the radially extending flange portion 36. As a result, when the the locking sleeve is in its locked position, the bore 52 surrounds ball bearings 35. When the first combination locking tumbler 50 is reciprocated into an unlocked position, the bore 54 surrounds ball bearings 35. As stated previously, the bores 52 and 54 function in a like manner to the central bore and the enlarged end bore of a conventional locking sleeve.

The locking sleeve of the present invention is preferably biased in its locked position by the use of a conventional locking spring, such as locking spring 38, telescoped on cylindrical portion 34, between the third combination locking tumbler 70 and the rearward abutment provided by the enlarged hexagonal flange portion 80. Spring 38 is configured to bias a locking sleeve into its locked position by bearing against segment 88 of flange portion 80 and third combination locking tumbler 70. To this end, segment 88 has a diameter less than or equal to the inner diameter of locking spring 38 or vice versa. As discussed previously, the construction of flange portion 80 also serves to limit the degree of travel of the locking sleeve. To this end, third combination locking tumbler 70 is provided with an inner periphery having a second pair of contiguous, adjacent bores 71 and 72 to form an internal shoulder 79. Bore 71 has a diameter that is greater than bore 72, greater than or equal to locking spring 38, greater than the segment 88 and less than the diameter of segment 87. The bore 72 has a diameter to produce a close fitting sliding engagement with the central portion 34. As illustrated by the FIGS. 6 and 7, the bore 71 is located adjacent to hexagonal flange portion 80. Thus, spring 38 can extend into bore 71 of third combination locking tumbler 70 and bear against shoulder 79 and against hexagonal flange portion 80 to urge first, second and third combination locking tumblers 50, 60 and 70 towards end 30 and radially extending flange portion 36 and hence the locking sleeve of the present invention into its locked position. A further advantage of such construction is to permit the locking spring 38 to be formed with sufficient turns to securely urge the combination locking sleeves into an abutting relationship with first combination locking sleeve 50 in its locked position. An additional advantage of this is to insure the centering of locking spring 38 relative to third combination locking tumbler 70. This conventional feature of locking sleeves is incorporated into a preferred embodiment of the present invention to wit: bores 71 and 72 of tumbler 70, because of its advantageous operation as discussed above. However, as can be appreciated, third combination locking tumbler 70 could have a constant diameter inner periphery 72 sized to produce a close fitting, sliding engagement with cylindrical portion 34; with spring 38 externally bearing against third combination locking tumbler 70; and with thus the concomitant loss of the advantageous construction as provided in the preferred embodiment. It is appropriate to point out here that the inner periphery 62 of second combination locking tumbler 60 has a diameter equal to the diameter of bore 52 of first combination locking tumbler 50. Additionally, the diameter of bore 72 of second combination locking tumbler is preferably equal to the diameter of inner periphery 62 of second combination locking tumbler 60.

Referring now to FIGS. 3, 4 and 5, the respective inner peripheries of the combination locking tumblers 50, 60 and 70 are provided with first, second and third locking pins 56, 64 and 74. All of the locking pins are connected, by a press fit within holes 53, 63 and 73. Referring now also, to FIG. 2, cylindrical portion 34 is provided with a plurality of circumferential grooves which in the preferred embodiment comprise first circumferential groove 31a, second circumferential groove 31b and third circumferential groove 31c. Referring to FIG. 7, as viewed when the locking sleeve of the present invention is in its locked position, groove 31a is located in the plane of first locking pin 56, groove 31b is located in the plane of second locking pin 64 and third circumferential groove 31c is located in the plane of third locking pin 74. All of the grooves are sized to produce a close fitting sliding engagement with its respective locking pin. As illustrated in FIG. 2, since first circumferential groove 31a is preferably located between holes 33 and end 30, first locking pin 56 is located within bore 54. It can of course optionally be placed on either side of the holes. However, the illustrated arrangement is preferred so as to adequately space groove 31a from 31b for easy fabrication of the invention herein. Additionally, As illustrated in FIG. 5, locking pin 74 is located within bore 74 so as to permit the rotation of third combination locking tumbler 70 without interference from spring 38. Referring now to FIGS. 2 and 6, a longitudinally extending groove 37 is provided. Longitudinally extending groove 37 must at least intersect the circumferential grooves 31a, 31b and 31c at right angles and extend to the other end 32 of the cylindrical portion 34 to permit assembly of the locking tumblers 50, 60 and 70 and the cylindrical portion 34. The longitudinally extending groove can of course extend throughout the entire length of cylindrical portion 34. The longitudinally extending groove 37 is operable for a sliding engagement with each of the locking pins 56, 64 and 74. As illustrated in FIG. 6, when the locking sleeve of the present invention is in its locked position, the locking pins 56, 64 and 74 are constrained to be in registry with their respective circumferential grooves 31a, 31b, and 31c as a result of the coplanar relationship thereof. When pins 56, 64 and 74 are located in grooves 31a, 31b and 31c, reciprocating movement of the locking sleeve and the formed locking tumblers is thus prevented. As illustrated in FIG. 7, when the locking sleeve of the present invention is to be reciprocated into its unlocked position, the locking pins must be located in said longitudinal groove 37. In the preferred embodiment, the longitudinal groove 37 extends through the sealing ring 44 and the threads 32a. It is understood that since, longitudinal groove 37 merely serves as a guide for the locking pins during the locking sleeves travel into its unlocked position, locking groove 37 could have a depth that is more shallow than that indicated. However, such construction would require shorter locking pins and for this reason, it would not be preferred.

As illustrated in FIG. 1 and discussed, the outer peripheries of the combination locking tumblers 50, 60 and 70 also have arrays of numbers, illustrated in FIG. 1 by respective reference numbers 57, 68 and 78. In the preferred embodiment these numbers are radially arranged about the outer peripheries of the combination locking tumblers 50, 60 and 70 with each number being equally spaced from another number. Each array preferably comprises a set of numbers from 0 through 9 inclusive. With reference also to FIG. 6, an index 39 is provided. This index 39 is preferably a groove in outer periphery 36a of radially extending flange portion in a coplanar relationship to longitudinally extending groove 37. For reasons which will become apparent, it is preferred that the groove forming index 39 should not be contiguous with groove 37 to prevent one from seeing the location of the locking pins relative to the arrays of numbers. When the locking sleeve of the present invention is in its locked position, with locking pins 56, 64 and 74 within their respective grooves 31a, 31b and 31c, the combination locking tumblers are operable for a random rotation about the cylindrical portion 34 so that the locking sleeve of the present invention is not operable for movement to its unlocked position and the grooved nipple 2 and thus the pneumatic tool or fixture connected thereto are not operable for separation from from the female coupling 1. It is only when the combination locking tumblers 50, 60 and 70 are rotated about the cylindrical portion 34 such that a selected number of each, known only to a user of the female coupling 1, is opposite to index 39 are the locking pins 56, 64 and 74 operable for entry into longitudinally extending groove 37 to permit reciprocation of the locking sleeve of the present invention into its unlocked position.

As can well be appreciated, combination locking tumblers are provided to a prospective user with their respective locking pins randomly arranged with respect to the arrays of numbers placed upon their outer peripheries. The exact combination is provided to a prospective user and owner of the female coupling 1 of the present invention.

The present invention contemplates embodiments thereof that comprehend any plurality of locking tumblers, locking pins and circumferential grooves. A set of three was used in the preferred embodiment in that three selected numbers are easily remembered; and given the space of the cylindrical portion of the coupling used, a sufficient length can be provided for each of the tumblers for easy manipulation. Two combination locking tumblers is not preferred in that a potential thief could possibly manipulate the tumblers into an unlocked position. It should be pointed out that although the present invention utilized a pneumatic coupling manufactured from REMACO, the use of the present invention with other pneumatic couplings that incorporate a reciprocating locking sleeve are possible and the scope of the present invention is not intended to be limited thereby. It also should be pointed out that although the motive force behind the present invention is to prevent thefts of pneumatic tools and fixtures, the present invention could be utilized simply to prevent unauthorized separation of a pneumatic coupling.

It will be understood by those skilled in the art that the invention has been described with reference to an exemplary preferred embodiment and that variations and modifications, in addition to those previously described, can be effected in the described embodiment without departing from the spirit and scope of the invention.

What is claimed is:

1. An improved pneumatic, self-sealing female coupling of the type that has a cylindrical portion having a pair of opposed ends, a forward abutment connected to one of said ends, a rearward abutment connected to the other of said ends, an air passage communicating between the said forward and the said rearward abutments, a ball bearing latch associated with said air passage and said cylindrical portion to releasably attach, at said forward abutment and within said air passage, a grooved nipple that is operable to be connected to a pneumatic tool or fixture, a locking sleeve of annular configuration that is telescoped on said cylindrical portion and is adapted for a reciprocating movement thereon between a locked position against the forward abutment, to activate said ball bearing latch, and an unlocked position, against the rearward abutment, to deactivate said ball bearing latch, means for biasing said locking sleeve in its said locked position, means, associated with said air passage for sealing said air passage when said grooved nipple is not located therein and for providing a seal between said grooved nipple and said air passage when said grooved nipple is located therein, and means for attaching an air line to said rearward abutment and in communication with said air passage;

the improvement comprising:

a locking sleeve including a plurality of independent sections, each of which forms a combination locking tumbler of annular configuration including:

an outer periphery having an array of numbers radially arranged thereabout, said numbers being equally spaced from one another; and an inner periphery having a locking pin connected thereto in an inwardly directed, radial orientation;

said cylindrical portion having:

a plurality of circumferential grooves spaced apart from one another with each of said grooves being located in the same plane of a said locking pin as viewed when said locking sleeve is in its said locked position and with each of said grooves being sized for a close fitting sliding engagement with a said locking pin;

a longitudinally extending groove at least intersecting said circumferential grooves at right angles and extending to said other end, said longitudinal groove being sized for a close fitting sliding engagement with said locking pins; and an index located on said forward abutment, whereby when said locking sleeve is in its said locked position, said locking pins are operable for registry in said circumferential grooves and said combination locking tumblers thereof are operable for a random rotation about said cylindrical portion so that said locking sleeve is not operable for movement to its unlocked position and said grooved nipple and pneumatic tool or fixture connected thereto is thus not operable for separation from said female coupling, but when said combination locking tumblers are rotated about said cylindrical portion such that a selected number of each, known only to a user of said female coupling is opposite to said index, said locking pins are operable for entry into said longitudinal groove to thereby permit said locking sleeve to be reciprocated into its said unlocked position to thereby permit said grooved nipple and said pneumatic tool or fixture connected thereto to be separated from said female coupling.

2. The improved female coupling of claim 1 wherein:

said plurality of combination locking tumblers include:

a first combination locking tumbler adjacent to said forward abutment;

a third combination locking tumbler adjacent to said rearward abutment; and a second combination locking tumbler located between said first and second combination locking tumblers; said plurality of locking pins include:

a first locking pin connected to said first combination locking tumbler;

a second locking pin connected to said second combination locking tumbler; and a third locking pin connected to said third combination locking tumbler; and said plurality of circumferential grooves include:

a first circumferential groove located in the plane of said first locking pin as viewed when said locking sleeve is in its locked position;

a second circumferential groove located in the plane of said second locking pin as viewed when said locking sleeve is in its locked position; and a third circumferential groove located in the plane of said third locking pin as viewed when said locking sleeve is in its locked position.

3. The pneumatic coupling of claim 2 wherein: said ball bearing latch includes:

said cylindrical portion having a plurality of holes, spaced from said one end, communicating between said air passage and the outer surface of said cylindrical portion, said holes being radially arranged about the outer surface of said cylindrical portion and equally spaced from one another;

a plurality of ball bearings sized to seat within said holes, protrude into said air passage and seat within a locking groove of said grooved nipple when located within said air passage to prevent the removal thereof;

said inner periphery of said first combination locking tumbler has a first pair of contiguous adjacent bores, one of which has a diameter to produce a close fitting sliding engagement with said ball bearings when seated to urge said ball bearing in a seated position, when surrounded therewith, within said holes and said locking groove and the other of which has a diameter to permit said ball bearings to unseat from said holes and said locking groove, said first pair of bores being arranged with said other bore being adjacent to said forward abutment, such that said one bore thereof surrounds said ball bearings when said locking sleeve is in its said locked position and said other bore surrounds said ball bearings when said locking sleeve is in its said unlocked position;

said first circumferential groove is located between said holes and said one end; and said first locking pin is located within said other bore of said first pair of bores.

4. The pneumatic coupling of claim 3 wherein:

said biasing means comprise a spring telescoped on said cylindrical portion and sized to bear against said said third combination locking tumbler and said rearward abutment; and said rearward abutment comprises a hexagonal flange portion having a pair of adjacent segments, one of which has a diameter greater than the other, said other segment having a diameter greater than that of said locking spring, said hexagonal flange portion connected to said central portion at its said other segment to provide a bearing surface for said locking spring by said other segment;

said inner periphery of said third combination locking tumbler comprises a second pair of contiguous adjacent bores, one of which is adjacent to said rearward abutment and the other of which is adjacent to said second combination locking tumbler, said one bore having a diameter greater than the other bore, greater than or equal to said locking spring, greater than said other segment of said hexagonal flange portion and less than that of said one segment of said hexagonal flange portion, said other bore having a diameter to produce a close fitting sliding engagement with said cylindrical portion so that a shoulder is formed at the juncture of said bores of said second pair, said locking spring having a length sized such that said locking spring bears against said bearing surface of said hexagonal flange portion and said shoulder within said third combination locking tumbler;

said third locking pin is located within said other bore of said second pair of bores; and said inner periphery of said second combination locking tumbler has a diameter equal to said one bore of said first pair of bores and said other bore of said second pair of bores has a diameter equal to said inner periphery of said second combination locking tumbler.

5. The pneumatic coupling of claim 4 wherein:

said forward abutment comprises a radially extending flange portion, said radially extending flange portion has an outer periphery and said index comprises a groove in said outer periphery of said radially extending flange portion in a coplanar relationship with said longitudinally extending groove and a depth so as not to be contiguous therewith.

6. The pneumatic coupling of claim 6 wherein said plurality of arrays of numbers, each comprise a set of numbers from 0 through 9 inclusive.

* * * * *